United States Patent [19]

Kwech et al.

[11] 4,454,957
[45] Jun. 19, 1984

[54] SELF-LOCKING SEALING PLUG AND INSTALLING METHOD

[75] Inventors: Horst Kwech, Lake Bluff; R. Jon Stouky, Grayslake, both of Ill.

[73] Assignee: Power Cutting Incorporated, Lake Bluff, Ill.

[21] Appl. No.: 451,110

[22] Filed: Dec. 20, 1982

[51] Int. Cl.³ .............................................. B65D 45/28
[52] U.S. Cl. ...................................... 220/323; 220/324
[58] Field of Search ............... 220/323, 324, 241, 243, 220/246, 251, 361

[56] References Cited

U.S. PATENT DOCUMENTS

| | | | |
|---|---|---|---|
| 2,597,014 | 5/1952 | Mariani | 220/323 |
| 2,599,527 | 6/1952 | Badger | 220/323 |
| 2,659,514 | 11/1953 | Henderson | 220/323 |
| 2,950,141 | 8/1960 | Koff | 220/324 |
| 2,987,226 | 6/1961 | Bane | 220/324 |
| 2,992,755 | 7/1961 | Goldschmidt | 220/324 |
| 3,363,797 | 1/1968 | Rosese | 220/324 |
| 3,680,730 | 8/1972 | Schlanger | 220/324 |
| 4,077,840 | 3/1978 | Aubert | 220/323 |
| 4,132,327 | 1/1979 | Van Dyke et al. | 220/223 |

*Primary Examiner*—Joseph Man-Fu Moy
*Attorney, Agent, or Firm*—Wood, Dalton, Phillips, Mason & Rowe

[57] ABSTRACT

A self-locking sealing plug having first and second cylindrical body members of the same diameter and mounted one to the other for relative movement, the first body member having a pair of radially-extendable slides at an end thereof with a spring member therebetween urging the slides outwardly, retaining pins on the second body member for holding the slides in a retracted position within the perimeter of the first body member and releasable by separating movement of the body members, a sealing flange on the second body member, and connecting structure for drawing the body members toward each other to decrease the distance between the extended slides and the sealing flange and with such movement bringing the retaining pins into engagement with the slides to hold the slides extended.

14 Claims, 8 Drawing Figures

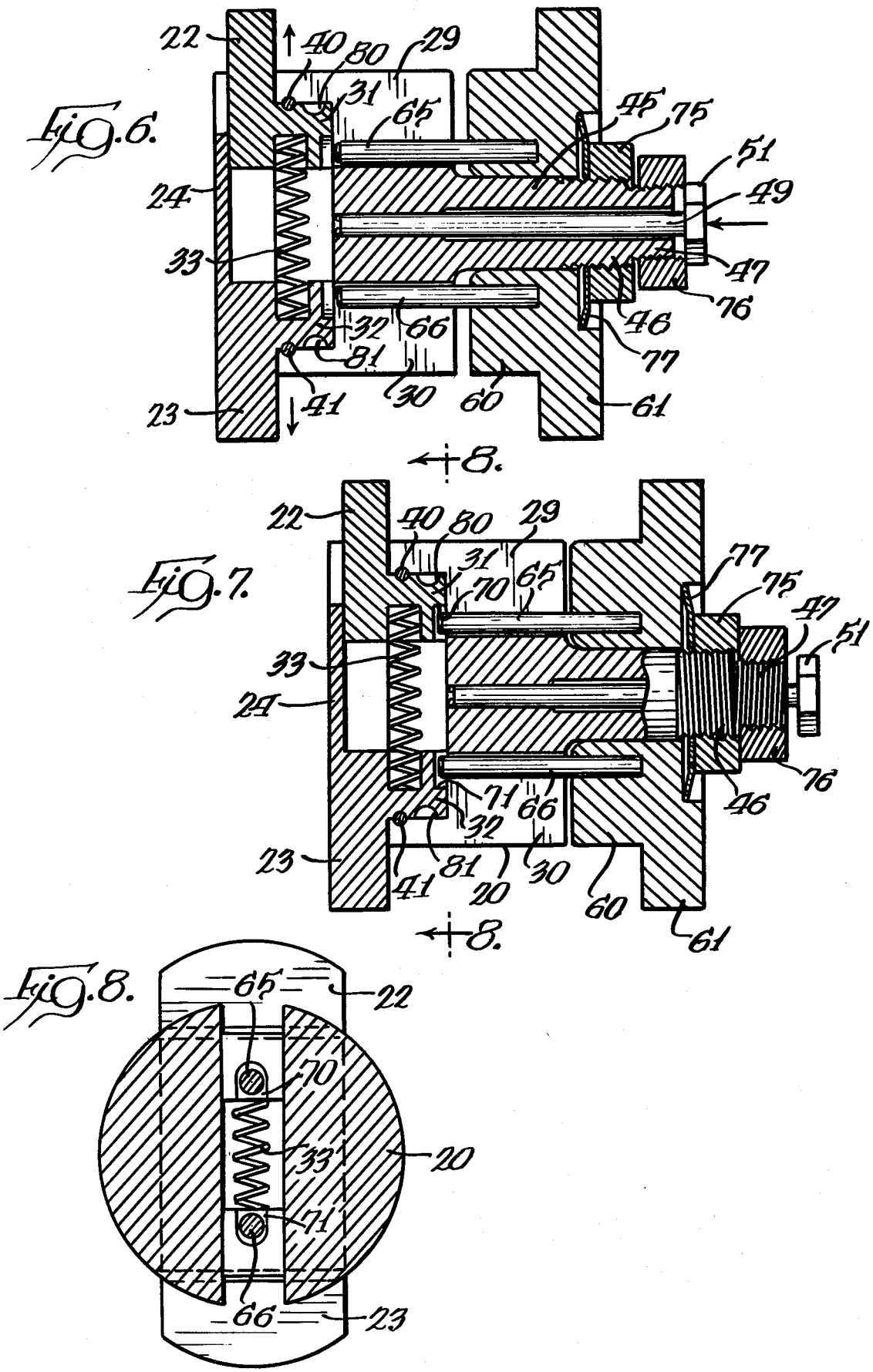

SELF-LOCKING SEALING PLUG AND INSTALLING METHOD

BACKGROUND OF THE INVENTION

This invention pertains to a self-locking sealing plug which can be positioned within an opening, such as an opening in the wall of a reactor core barrel, by remotely-controlled manipulator structure, with the sealing plug having automatically-extendable locking members which are rendered operative by the manipulator structure.

There are many instances wherein an opening in a wall needs to be sealed. One particular example is an opening in the wall of a reactor core barrel of a nuclear reactor. The reactor core barrel is located in a "hot" area and therefore the sealing of the opening in the wall must be by structure which is inherently reliable in its sealing function and which can also be positioned and firmly locked in such position by remotely-operable manipulator structure. Prior art attempts to meet these objectives have not been successful.

SUMMARY OF THE INVENTION

A primary feature of the invention disclosed herein is to provide a self-locking sealing plug for an opening in a wall, such as a wall of a reactor core barrel, having structure facilitating remote positioning and locking thereof in the opening as well as structure which can be readily set and retained in sealing relation with the wall. Additionally, the self-locking sealing plug must be: fail-safe in that, if a part of the plug fails under tensive load, the plug will still remain intact; constructed to prevent fall-out of parts within the reactor core barrel; and of a design permitting rapid installation.

In carrying out the foregoing, it is an object of the invention to provide a method of sealing an opening in a wall, such as the wall of a reactor core barrel, by means of a device having a first body member with releasably-latched extendable locking members at one end thereof and a second body member mounted for movement with and relative to the first body member and with a wall-engaging sealing flange, and coacting means for drawing the body members toward each other, the method comprising, aligning the first and second body members with the opening and, thereafter, advancing the closely-spaced body members into the opening to position the locking members at the inner face of the wall, releasing the locking members by increasing the space between the body members to enable their extendable movement to locations abutting the inner wall adjacent the opening, and drawing the body members together to cause compressive engagement of the locking members with the inner face of the wall and of the sealing flange with the outer face of the wall and with the locking members firmly held in extended locking position.

Still another object of the invention is to provide a self-locking sealing plug having first and second body members of the same cross-sectional shape and mounted one to the other for relative movement, the first body member having a pair of extendable locking members at an end thereof with spring means urging the locking members outwardly, locking means on the second body member for holding the locking members in a retracted position within the perimeter of the first body member and releasable by separating movement of the body members, a sealing flange on the second body member, means for drawing the body members toward each other to decrease the distance between the extended locking members and the sealing flange to firmly position the sealing plug with respect to a wall having an opening in which the sealing plug is positioned, and means for locking the locking members in their extended locking position.

Additional objects of the invention relate to structure of the sealing plug as defined in the preceding paragraph wherein the first body member has a dovetail groove, with the locking members being in the form of dovetail slides for retention in the groove and with the first body member having means to prevent movement of the locking members out of the groove, the locking means on the second body member for holding the locking members in a retracted position comprise a pair of retaining pins carried by the second body member and which can have their position relative to the locking members varied by varying the distance between the body members and when the body members are close together the retaining pins function to either hold the locking members in position, either extended or retracted, and the first body member has a central stem on which the second body member is movably mounted and with an end of the stem having oppositely threaded sections for receiving a tensioning nut and a safety lock nut to draw the body members together and hold them in locked relation, and with the central stem having a central opening through which a safety bolt extends and which has a head extending beyond the end of the central stem to assure the parts remain in assembled relation.

BRIEF DESCRIPTION OF THE DRAWINGS

FIG. 6 is a view similar to FIG. 4, showing the body members spaced apart a greater distance than that shown in FIG. 4 and with the locking members extended;

FIG. 7 is a view, similar to FIG. 6, with the body members brought closer together to lock the locking members in extended position; and FIG. 8 is a vertical section, taken generally along the line 8—8 in FIG. 7.

DESCRIPTION OF THE PREFERRED EMBODIMENT

Figure 1:
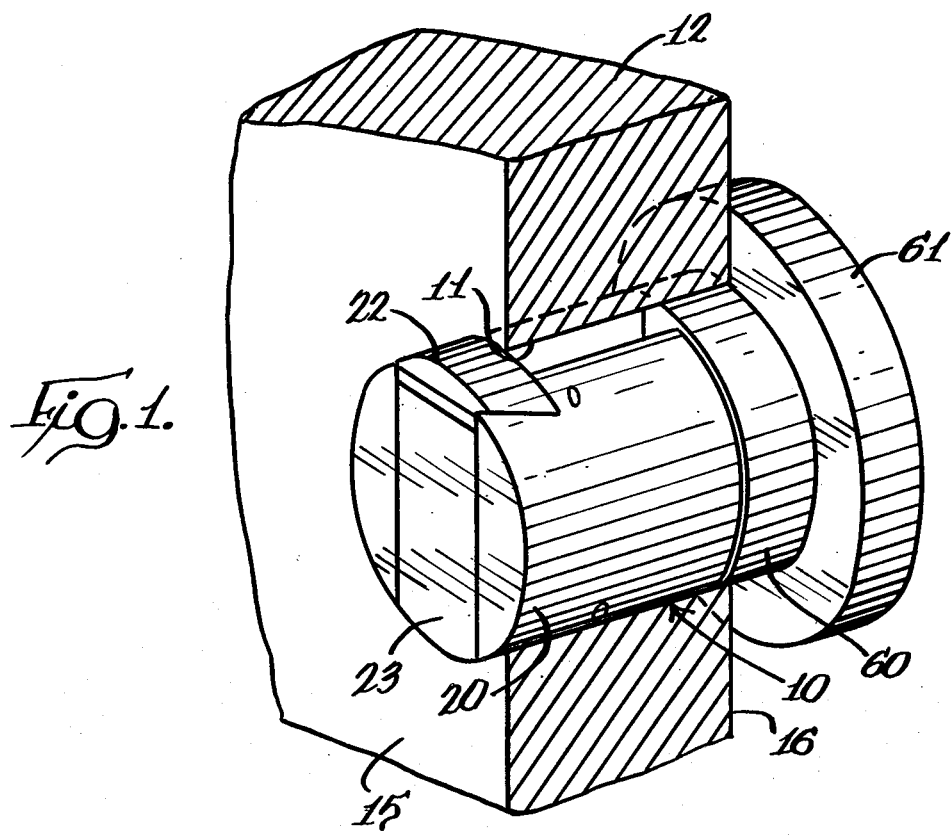
FIG. 1 is a perspective view, showing the sealing plug associated with an opening in a wall, with the wall shown in cross section and the sealing plug in unlocked relation to the wall.

The self-locking sealing plug, indicated generally at 10, is shown positioned within an opening 11 in a wall 12 having an inner face 15 and an outer face 16. The wall 12 can be the wall of a reactor core barrel of a nuclear installation. The reactor core barrel is in a "hot" area and, therefore, the sealing of the opening 11 must be accomplished by a structure which can be positioned and locked by remotely-operable manipulator structure.

The sealing plug 10 has a first body member 20, which is shown as being generally cylindrical, and which has a dovetail groove 21 extending transversely to the length thereof in which a pair of locking members, in the form of slides 22 and 23, are movably mounted. Each of these slides has sloped edges to coincide with the sloped sides of the dovetail groove whereby the slides are retained against movement axially of the body member. As seen particularly in FIGS. 2 and 4, the slides are offset and are overlapped in all positions by an extension 24 of the slide 23.

Figure 2:
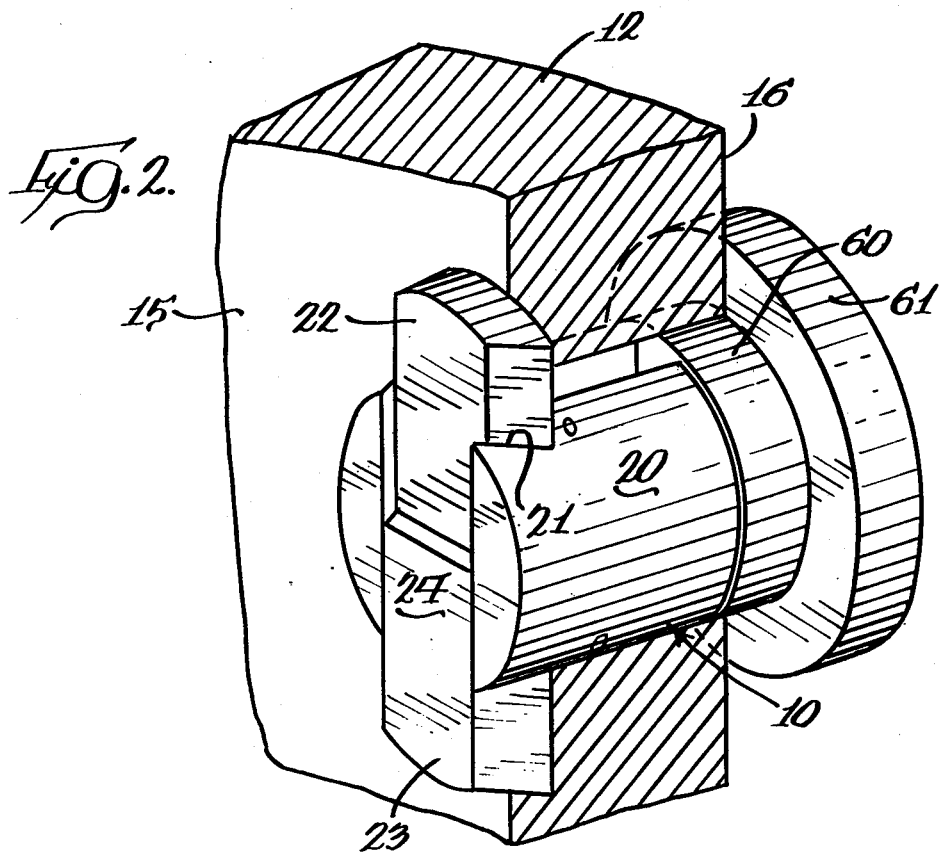
FIG. 2 is a view, similar to FIG. 1, showing the sealing plug in locked relation with the wall.
Figure 3:
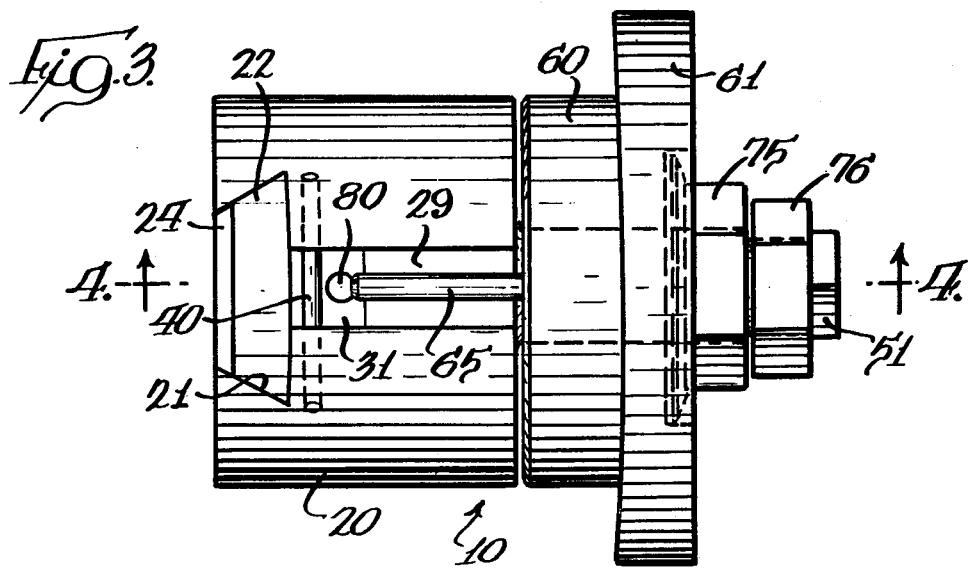
FIG. 3 is a plan view of the sealing plug, with the locking members held in retracted position and the body members of the sealing plug in relatively close relation.

The first body member 20 has a pair of opposed, longitudinal recesses 29 and 30 which communicate with the dovetail groove 21 and which movably receive a pair of shoulders integral with the slides. The slide 22 has a shoulder 31 and the slide 23 has a shoulder 32. A coil spring 33 is positioned between the shoulders and has the ends thereof confined within recesses in the shoulders. This spring is compressed, as shown in FIG. 4, and acts to urge the slides from a retracted position within the perimeter of the body member 20, as shown in FIGS. 1 and 4, to an extended position, as shown in FIGS. 2 and 6.

Figure 4:
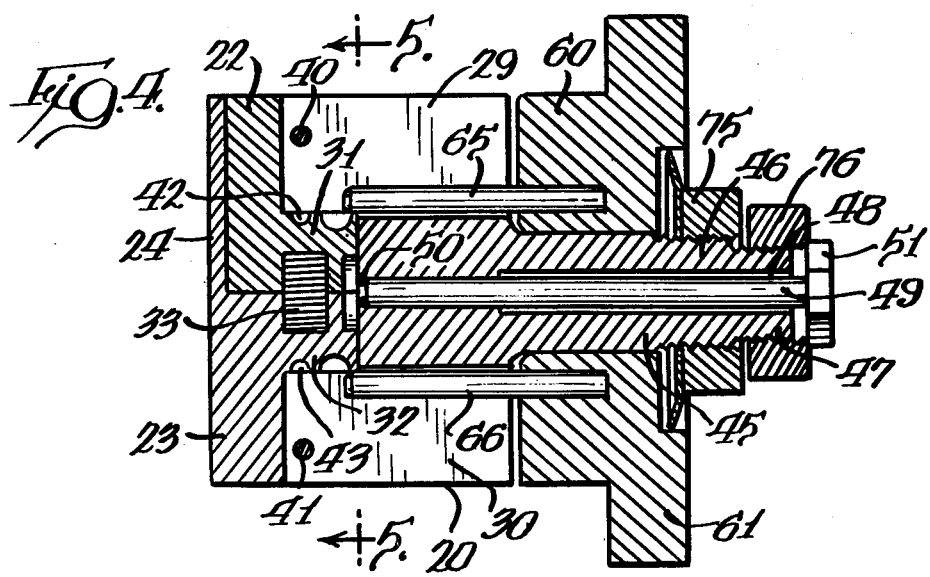
FIG. 4 is a vertical section, taken generally along the line 4—4 in FIG. 3.
Figure 5:
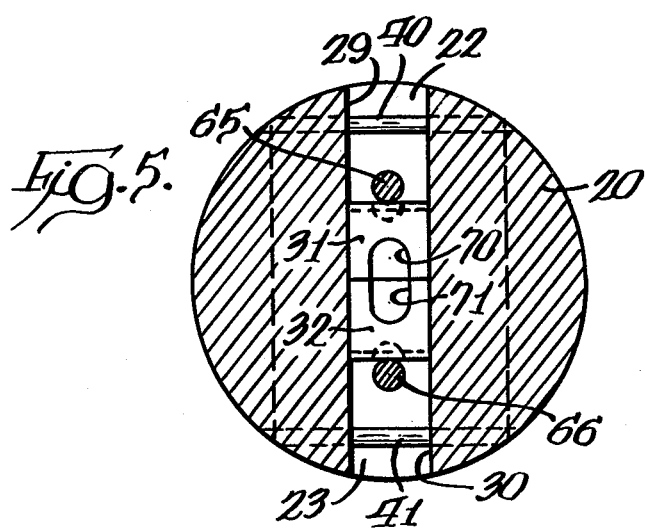
FIG. 5 is a vertical section, taken generally along the line 5—5 in FIG. 4.

In assembly of the slides to the body member 20, they can be inserted endwise of the dovetail groove 21 and, after being positioned substantially as shown in FIG. 4, a pair of safety pins 40 and 41 can be pushed through openings in the body member to span the recesses 29 and 30, respectively, and engage within recesses 42 and 43 in the shoulders to limit the outward movement of the slides.

A stem 45 extends centrally from the first body member 20 from an end thereof opposite the end having the dovetail groove 21 and has an end with a right-hand threaded section 46 and a left-hand threaded section 47. The stem 45 has a central opening 48 and a safety bolt 49 extends through the central opening and an extension of the opening in the first body member to a location wherein an inner end thereof can be welded to the first body member, as indicated at 50. The safety bolt has a head 51 which retains nut structure in association with the sealing plug and assures retention of the sealing plug structure in associated relation in the event there is a failure of the central stem and nut structure. As shown in FIG. 7, the head 51 is spaced from the nut structure when the sealing plug is in final sealing position.

The sealing plug has a second cylindrical body member 60 which is movably mounted on the central stem 45 of the first body member. The second body member has a sealing flange 61 of a larger diameter. The second body member carries means for latching or locking the slides 22 and 23 in either the retracted position, shown in FIG. 4, or the extended position, shown in FIG. 7. This locking means comprises a pair of retaining pins 65 and 66 which, at one of their ends, are seated fixedly in openings within the second body member 60 and which extend lengthwise of the recesses 29 and 30 in the first body member toward the slides 22 and 23. The retaining pins are of a length to overlie the slide shoulders 31 and 32 when the body members are closely spaced together, as shown in FIG. 4, to lock the slides in retracted position and to lie outside the path of movement of the shoulders as the slides extend when the body members are spaced further apart and as shown in FIG. 6. The retaining pins also have the function to lock the slides 22 and 23 in their extended position when the first body member 20 and the second body member 60 are closely spaced together, as shown in FIG. 7, with the ends of the retaining pins engaging within openings 70 and 71 in the shoulders 31 and 32, respectively.

The right-hand threaded section 46 of the stem 45 mounts a tensioning nut 75 and the left-hand threaded section 47 mounts a safety lock nut 76. A Belleville spring 77 is mounted within a recess in the sealing flange 61 of the second body member and positioned for engagement by the tensioning nut 75.

In the use of the sealing plug and the method of sealing an opening in a wall, the first and second body members are positioned in closely-spaced relation, as shown in FIG. 4, with the ends of the retaining pins 65 and 66 overlying the slide shoulders 31 and 32 and with the tensioning nut 75 and safety lock nut 76 backed off. The sealing plug is then moved by remotely-operable structure to a position aligned with the opening 11 of the wall and then moved into the opening and to the position shown in FIG. 1. The sealing plug is then held with the sealing flange 61 against the outer face 16 of the wall and a force exerted against the externally-exposed structure associated with the first body member 20, such as the head 51 of the safety bolt 49, to increase the distance between the body members to the relation shown in FIG. 6. This moves the slide shoulders 31 and 32 away from the ends of the retaining pins 65 and 66 whereby the spring 33 is free to move the slides to an extended position as determined by engagement of the shoulders with the safety pins 40 and 41. This results in the slides extending beyond the opening and abutting portions of the inner face 15 of the wall, as shown in FIG. 2.

While the sealing flange 61 is held by the remotely-operable structure, the tensioning nut 75 is engaged by a remotely-operable member and rotated to a pre-set torque value and which compresses the Belleville spring 77 and which acts to draw the body members together to the position shown in FIG. 7, wherein the ends of the retaining pins 65 and 66 engage within the recesses 70 and 71 of the slide shoulders to hold the slides extended. It will be obvious that the lengthwise dimensions of the parts will be selected, dependent upon the thickness of the wall having the opening, whereby the body members and associated structures can be brought to the position shown in FIG. 7.

With the wall 12 having a curvature, as is found in the wall of a reactor core barrel, the inner faces of the slides 22 and 23 are provided with a slight convex curvature, to match that of the inner face 15 of the wall and the sealing flange 61 is provided with a slight concave curvature to closely match the curvature of the outer face 16 of the wall. This also prevents rotation of the body members as the tensioning nut 75 is tightened.

Additional safeguards inherent in the structure and not previously mentioned include a visual indication if the slides 22 and 23 do not extend, since the operation of the tensioning nut 75 will not pull the plug into position, the double safeguard to prevent fall-out of the slides 22 and 23 including the retention by the retaining pins 65 and 66, as well as the safety pins 40 and 41 and, if there is any failure of the central stem 45 or the nuts 75 and 76, the safety bolt 49 with its head 51 will retain the parts in a "loose fit" mode which will be easily noticeable during inspection.

In the event removal of the sealing plug is necessary, a remotely-operable removal tool head can be operated to twist off the head 51 of the safety bolt and the safety lock nut 76 can be backed off and a small shaft extension screwed on the reduced diameter threaded section 47 in its place. Tensioning nut 75 can then be backed off and the second body member 60 as well as the retaining pins 65 and 66 can be pulled back on the shaft extension. A cam-activated, twin-finger tool can then be inserted into the recesses 29 and 30 of the first body member and seated in a pair of indentations 80 and 81 in the slide shoulders 31 and 32, respectively, and activated to contract the slides 22 and 23 to a retracted position and the first body member can then be withdrawn from the wall opening.

We claim:

1. A sealing device comprising, a first cylindrical body member having a pair of releasably-latched extendable locking members at an end thereof which can extend radially beyond the perimeter of said first body member, a second cylindrical body member of the same diameter as the first body member and having a larger-diameter sealing flange at an end thereof, means mounting the body members one on the other for relative movement therebetween, locking means carried on the second body member for holding the locking members latched in retracted position and movable to a releasable position by separating movement of the body members, and means for drawing the body members toward each other to draw the extended locking members and sealing flange toward each other and into compressive engagement with the faces of a wall having an opening into which the sealing device may be positioned.

2. A sealing device comprising, a first body member having a pair of releasably-latched extendable locking members at an end thereof which can extend outwardly of said first body member from a retracted position, a second body member of the same cross-section as the first body member and having a sealing flange at an end thereof, means mounting the body members one on the other for relative movement therebetween, locking means carried on the second body member for holding the locking members latched in retracted position and movable to a releasable position by separating movement of the body members, and means for compressively drawing the body members toward each other to draw the extended locking members and sealing flange toward each other.

3. A self-locking sealing plug having first and second cylindrical body members of the same diameter and mounted one to the other for relative movement, the first body member having a pair of radially-extendable locking members at an end thereof and spring means urging the locking members outwardly, locking means on the second body member for holding the locking members in a retracted position within the perimeter of the first body member and releasable by separating movement of the body members, a sealing flange on said second body member, and means for drawing the body members toward each other to decrease the distance between the extended locking members and the sealing flange.

4. A sealing plug as defined in claim 3 wherein said locking means also act to hold the locking members extended when the body members are drawn toward each other.

5. A sealing plug as defined in claim 3 wherein said first body member has a reduced diameter stem on which said second body member is movably mounted, and an end of the stem being threaded to receive a nut for drawing said body members toward each other.

6. A sealing plug as defined in claim 3 wherein said locking means comprises a pair of retaining pins extending from said second body member, said locking members having shoulders, and the retaining pins having a length to engage the shoulders when the body members are close together and to be free of the shoulders when the body members are farther apart whereby the retaining pins can engage the top of the shoulders to hold the locking members in extended position or the bottom of the shoulders to hold the locking members extended.

7. A self-locking sealing plug comprising, first and second relatively movable body members, a pair of slides on the first body member movable between a retracted position and an extended locking position, means urging the slides to the extended locking position, means on the second body member for engaging and holding the slides in retracted position against the urging means when said body members are closely adjacent each other and movable out of engagement with the slides when the distance between said body members is increased.

8. A sealing plug as defined in claim 7 wherein each of said first and second body members have a cylindrical section of the same diameter to fit within an opening, and the second body member having a larger diameter flange to abut against a surface of a member having the opening to be sealed.

9. A sealing plug as defined in claim 7 wherein said first body member has a reduced diameter stem extending centrally therefrom and which has a threaded end, said second body member having a central opening for movable mounting thereof on said stem, and a nut on said threaded end to draw the body members together.

10. A sealing plug as defined in claim 7 wherein said first body member has a transversely-extending dovetail groove at an end thereof and said slides are dovetailed to be slidably captured in said dovetail groove, each of said locking members having a shoulder and a pair of safety pins positioned on said first body member to limit movement of said slides in said groove.

11. A sealing plug as defined in claim 7 including means for locking the slides in extended position.

12. A self-locking sealing plug comprising, a first body member with a stem extending centrally from one end thereof, a groove at an end of said first body member opposite the end having the stem, a pair of slides movably mounted in said groove and each having a shoulder, means urging said slides outwardly of the groove, means spanning each recess to limit the outward movement of the slides, a second body member movably mounted on said stem and having a larger diameter sealing flange at an end thereof, a pair of retaining pins fixed to said second body member, said retaining pins having a length to lie in the path of movement of said shoulders when the body members are close together and to not be in said path when the body members are farther apart whereby the retaining pins may overlie said shoulders to hold the slides retracted, means for drawing said body members together, and recesses in said shoulders to receive the ends of said retaining pins when the slides are extended and the body members are drawn together to lock the slides in extended position.

13. A self-locking sealing plug for an opening in the wall of a member comprising, a first body member with a stem extending centrally from one end thereof and having a threaded section adjacent an end thereof, a dovetail groove at an end of said first body member opposite the end having the stem and which extends transverse to the length of the first body member, a pair of recesses in said first body member opening to said dovetail groove, a pair of slides movably mounted in said dovetail groove and each having a shoulder positioned one in each of said recesses, a spring positioned between said shoulders urging said slides outwardly of the groove, a second body member of the same cross section as the first body member and having an opening to receive and movably mount on said stem and having a larger diameter sealing flange at an end thereof, a pair of retaining pins fixed to said second body member and positioned in said recesses, said retaining pins having a length to lie in the path of movement of said shoulders when the body members are close together and to not be in said path when the body members are farther apart whereby the retaining pins may selectively overlie said shoulders to hold the slides retracted, a tensioning nut on said threaded section and recesses in said shoulders to receive the ends of said retaining pins when the slides are extended and the body members are in the last-mentioned position to lock the slides in extended position.

14. A self-locking sealing plug for an opening in the wall of a reactor core barrel and which can be locked in position by remotely-controlled manipulator structure comprising, a cylindrical first body member, a reduced diameter stem extending centrally from one end of the first body member and having two oppositely-threaded sections adjacent an end thereof and a central bore, a safety pin in said central bore having an inner end welded to the first body member and an enlarged head outwardly of said stem, a dovetail groove at an end of said first body member opposite the end having the stem and which extends transverse to the length of the first body member, a pair of recesses in said first body member opening to said dovetail groove, a pair of overlapping slides movably mounted in said dovetail groove and each having a shoulder positioned one in each of said recesses, a spring positioned between said shoulders urging said slides outwardly of the groove, a pair of safety pins positioned one to span each recess and limit the outward movement of a slide, a cylindrical second body member of the same diameter as the first body member and having an opening to receive and movably mount on said stem and having a larger diameter sealing flange at an end thereof, a pair of retaining pins fixed to said second body member and positioned in said recesses, said retaining pins extending toward said slides and having a length to lie in the path of movement of said shoulders when the body members are close together and to not be in said path when the body members are farther apart whereby the retaining pins may overlie said shoulders to hold the slides retracted, a tensioning nut on one of said threaded sections, a Belleville spring on said stem between said sealing flange and said tensioning nut, a safety lock nut on said other threaded section whereby the body members can be compressively urged toward each other and held in such position, and recesses in said shoulders to receive the ends of said retaining pins when the slides are extended and the body members are in the last-mentioned position to lock the slides in extended position.

* * * * *